(12) United States Patent
Exton et al.

(10) Patent No.: US 9,948,702 B2
(45) Date of Patent: *Apr. 17, 2018

(54) WEB SERVICES DOCUMENTATION

(71) Applicant: International Business Machines Corporation, Armonk, NY (US)

(72) Inventors: Scott A. Exton, Queensland (AU); Leo M. M. Farrell, Queensland (AU); Keiran W. Robinson, Southport (AU); Jasmine A. Smith, Southport (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/041,065

(22) Filed: Feb. 11, 2016

(65) Prior Publication Data

US 2016/0359954 A1    Dec. 8, 2016

Related U.S. Application Data

(63) Continuation of application No. 14/730,274, filed on Jun. 4, 2015.

(51) Int. Cl.
    *H04L 29/08* (2006.01)
    *G06F 17/30* (2006.01)

(52) U.S. Cl.
    CPC ........ H04L 67/10 (2013.01); G06F 17/30923 (2013.01); H04L 67/02 (2013.01); H04L 67/327 (2013.01)

(58) Field of Classification Search
    CPC ....... H04L 67/10; H04L 67/02; H04L 67/327; G06F 17/30923
    See application file for complete search history.

(56) References Cited

U.S. PATENT DOCUMENTS

| 6,873,992 B1* | 3/2005 | Thomas ............ G06F 17/30887 |
| 7,404,189 B2 | 7/2008 | Benedetti |
| 8,756,568 B2 | 6/2014 | Hale et al. |
| 2009/0019020 A1* | 1/2009 | Dhillon ............. G06F 17/30398 |

(Continued)

FOREIGN PATENT DOCUMENTS

| EP | 1569106 B1 | 12/2015 |
| WO | 2014141144 A2 | 9/2014 |

OTHER PUBLICATIONS

Nolan et al., Chapter 10 REST-based Web Service, DOI 10.1007/978-1-4614-7900-0_10, 2014.*

(Continued)

*Primary Examiner* — Brian J Gillis
*Assistant Examiner* — Steve Lin
(74) *Attorney, Agent, or Firm* — David S. Richart; James H. Mayfield

(57) ABSTRACT

A method for distributing documentation for an application service includes receiving, at an endpoint configured to provide an application service, a documentation request from a requester, preparing a response that includes documentation corresponding to the application service, and transmitting the response to the requester. The method may also include receiving, at the endpoint, a service request for the application service and responding to the service request. The documentation may conform to a requested format.

1 Claim, 8 Drawing Sheets

(56) References Cited

U.S. PATENT DOCUMENTS

| | | | |
|---|---|---|---|
| 2010/0250486 A1* | 9/2010 | Brunner | G06F 17/3089 707/603 |
| 2011/0113341 A1* | 5/2011 | Liensberger | G06F 9/4443 715/738 |
| 2014/0289699 A1 | 9/2014 | Paterson et al. | |
| 2014/0325337 A1* | 10/2014 | McWeeney | H04L 67/02 715/234 |
| 2015/0120729 A1* | 4/2015 | Slade | H04L 67/02 707/736 |
| 2015/0312312 A1 | 10/2015 | Seren et al. | |
| 2015/0378994 A1 | 12/2015 | Kaplinger et al. | |

OTHER PUBLICATIONS

Hadley, Marc, "Web Application Description Language", W3C Member Submission Aug. 31, 2009, Copyright 2005-2009 Sun Microsystems; Inc., 4150 Network Circle, Santa Clara, California 95054, U.S.A., pp. 1-22, <http://www.w3.org/Submission/wadl/>.

Nolan et al., "Chapter 10 REST-based Web Services", XML and Web Technologies for Data Sciences with R, Use RI, pp. 339-379, DOI 10.1007/978-1-4614-7900-0_10, © Springer Science+Business Media New York 2014.

Subramanian et al., "Live API Documentation", ICSE'14, May 31-Jun. 7, 2014, Hyderabad, India, Copyright 2014 ACM 978-1-4503-2756-5/14/05, pp. 643-652, http://dx.doi.org/10.1145/2568225_2568313, <http://www.w3.org/Submission/wadl/>.

"Enunciate", noted by Inventor in Main Idea dated Feb. 28, 2015, pp. 1-3, <http://enunciate.codehaus.org>.

"What is Swagger", GitHub, pp. 1-3, © 2015 GitHub, Inc., <https://github.com/wordnik/swagger-spec/wiki>.

Exton et al., "Web Services Documentation", U.S. Appl. No. 14/730,274, filed Jun. 4, 2015, pp. 1-36.

IBM Appendix P, list of patents and patent applications treated as related, Mar. 3, 2016, 2 pages.

Mell et al., "The NIST Definition of Cloud Computing", National Institute of Standards and Technology, U.S. Department of Commerce, Special Publication 800-145, Sep. 2011, 7 pages.

\* cited by examiner

```
                                    312
                                     (
                              GET /login HTTP/1.1
                              Host: webseal.ibm.com
         310A→                Content-Type: text/html
                              Accept: documentation/html
                              ...         )        (
                                    312  314      316
                                     (
                              GET /login HTTP/1.1
         310B→                Host: webseal.ibm.com
                              Content-Type: application/json
                              Accept: documentation/wadl
                              ...         )        (
                                         314      316
```

FIG. 3A

```
                                                          ←330
         HTTP/1.1 200 OK
         Date: Sat, 23 August 2014 16:11:34 GMT,
         Server: IBM Web Server/1.9.8.9
         Last-Modified: Sun, 18 May 2014 09:20:00 GMT
 320A→   Content-Type: text/html
         ...
                                                          ←340
         <html>
         <head><title>Documentation for /login</title>
         </head>
         ...      [HTML Document continues]

←330
         HTTP/1.1 200 OK
         Date: Sat, 23 August 2014 16:11:34 GMT,
         Server: IBM Web Server/1.9.8.9
         Last-Modified: Fri, 15 November 2013 06:14:40 GMT
 320B→   Content-Type: application/vnd.sun.wadl+xml       ←340
         ...

<application xmlns:xsi="http://www.w3.org/2001/XMLSchema-instance"
           xsi:schemaLocation="http://wadl.dev.java.net/2009/02 wadl.xsd"
           xmlns:ws="ibm:isam:ws"
         ...      [WADL Document Continues]
```

FIG. 3B

```
                    412
                     (
              GET /login HTTP/1.1
410A →        Host: webseal.ibm.com
              Content-Type: application/json
              Accept: sample/json
              ...        )  (
                      412 414 416
                      (
410B →        GET /login HTTP/1.1
              Host: webseal.ibm.com
              Content-Type: application/xml
              Accept: sample/xml
              ...        )  (
                         414 416
```

FIG. 4A

```
                                              430
          HTTP/1.1 200 OK
          Date: Sat, 24 August 2014 16:11:44 GMT,
          Server: IBM Web Server/1.9.8.9
          Last-Modified: Sun, 18 May 2014 09:20:00 GMT
420A →    Content-Type: application/json
          ...
                                              440
          { "credentials" : {
                  "email"    : "testuser@ws.ibm.com",
                  "password" : "hunter2"
            },
            "token" : "SGVsbG8gZnJvbSBBBREwh"
          }
```

```
                                              430
          HTTP/1.1 200 OK
          Date: Sat, 24 August 2014 16:11:44 GMT,
          Server: IBM Web Server/1.9.8.9
          Last-Modified: Fri, 15 November 2014 06:14:40 GMT
420B →    Content-Type: application/xml
          ...
                                              440
          <loginRequest>
            <credentials>
              <email>testuser@ws.ibm.com</email>
              <password>hunter2</password>
            </credentials>
            <token>SGVsbG8gZnJvbSBBBREwh</token>
          </loginRequest>
```

FIG. 4B

WEB SERVICES DOCUMENTATION

BACKGROUND OF THE INVENTION

The present invention relates generally to computing services and specifically to distributing documentation for computing services.

Applications that use an application service such as a web service must communicate properly with the service via a communication protocol such as HTTP. To facilitate proper communication, one or more application service developers may document the application programming interface (API) used to access the service and attempt to distribute the documentation to application developers. However, the application service developer(s) and corresponding organization may not have direct knowledge of each of the application developers. In turn, the application developers may not know who they should contact to obtain documentation for the application services. Furthermore, there may be many versions of the API and the associated documentation. An application developer may not know which version of the API a particular application service adheres to. Consequently, routing (i.e., distribution) of the correct documentation from the application service developer(s) to each application developer may not occur and the application services may go unused or be used in a suboptimal manner.

SUMMARY

A method for distributing documentation for an application service includes receiving, at an endpoint configured to provide an application service, a documentation request from a requester, preparing a response that includes documentation corresponding to the application service, and transmitting the response to the requester. The method may also include receiving, at the endpoint, a service request for the application service and responding to the service request. The documentation may conform to a requested format.

BRIEF DESCRIPTION OF THE DRAWINGS

FIG. 3A is a text diagram depicting two examples of a documentation request in accordance with at least one embodiment of the present invention;

FIG. 3B is a text diagram depicting two examples of a documentation response in accordance with at least one embodiment of the present invention;

FIG. 4A is a text diagram depicting two examples of an example request in accordance with at least one embodiment of the present invention;

FIG. 4B is a text diagram depicting two examples of an example response in accordance with at least one embodiment of the present invention;

DETAILED DESCRIPTION

The embodiments disclosed herein enable the distribution of documentation for application services such as web-based services or cloud-based services. It should be noted that various terms used herein may be subject to trademark rights in various jurisdictions throughout the world and is used here only in reference to the products or services properly denominated by the marks to the extent that such trademark rights may exist.

Figure 1:
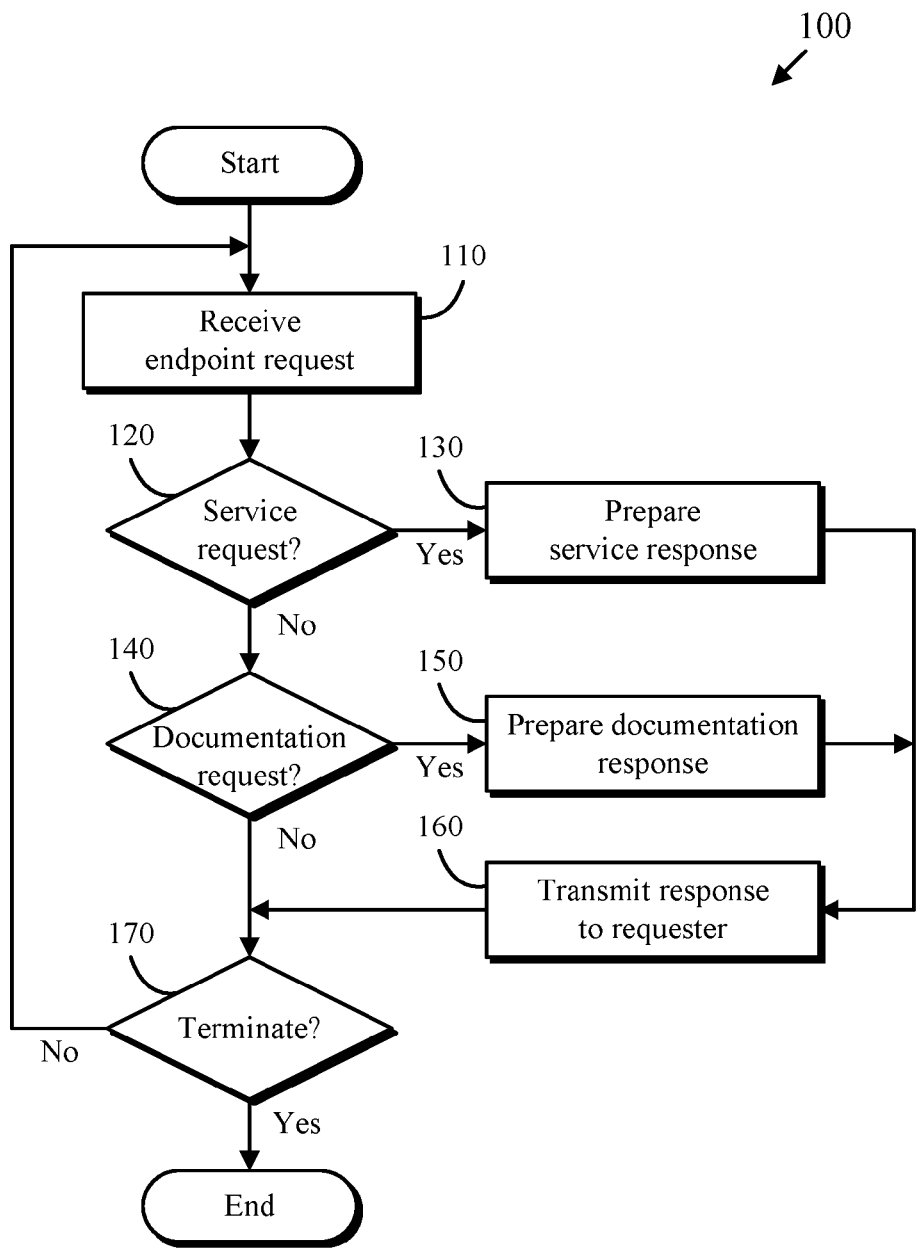
FIG. 1 is a flowchart diagram depicting one example of an endpoint processing method in accordance with at least one embodiment of the present invention.

For example, FIG. 1 is a flowchart diagram depicting one example of an endpoint processing method 100 in accordance with at least one embodiment of the present invention. As depicted, the endpoint processing method 100 includes receiving (110) an endpoint request, determining (120) if the request is a service request, preparing (130) a service response, determining (140) if the request is a documentation request, preparing (150) a documentation response, transmitting (160) the response, and determining (170) whether to terminate. The endpoint processing method 100 may be leveraged by an application service to respond to application service requests. For example, the endpoint processing method 100 may be executed on an endpoint server such as a web server or a cloud server that provides stateless interactions with clients such as is required of a RESTful endpoint service. In some embodiments, the application service requests and responses conform to the HTTP protocol.

Receiving (110) an endpoint request may include may include receiving, at an applications services endpoint, a request from a requester such as an application. The request may conform to an internet communication protocol such as HTTP.

Determining (120) if the request is a service request may include inspecting a header such as an HTTP header that is included in the request received in the receiving operation 110. For example, an HTTP header corresponding to a service request may have the string 'application' included in the HTTP Content-Type field and a specific service function indicated after the HTTP GET command. Preparing (130) a service response may include executing a service function indicated in the service request and formatting the results provided by the service function for transmission to the requester.

Determining (140) if the request is a documentation request may include inspecting a header such as an HTTP header that is included in the request received in the receiving operation 110. For example, an HTTP header corresponding to a documentation request may have the string 'documentation' included in the HTTP Content-Type field and a specific service function indicated after the HTTP GET command. In some embodiments, an example or template for a specific service function may be requested in addition to, or in place of, conventional documentation.

Preparing (150) a documentation response may include may include retrieving documentation corresponding to the indicated service function. The documentation may specify an input data schema and an output data schema for service requests and responses respectively. The documentation may be formatted according to a format specified in the documentation request (if any).

Transmitting (160) the response may include transmitting the response prepared in the preparing operation 130 or the preparing operation 150. The response may be transmitted to the requester that submitted the endpoint request. Determining (170) whether to terminate may include detecting if a signal or semaphore indicating that the endpoint application service is to be terminated has been received. If so, the depicted method terminates. If not, the depicted method loops to the receiving operation 110 and continues processing service requests and documentation requests.

Figures 2A, 2B:
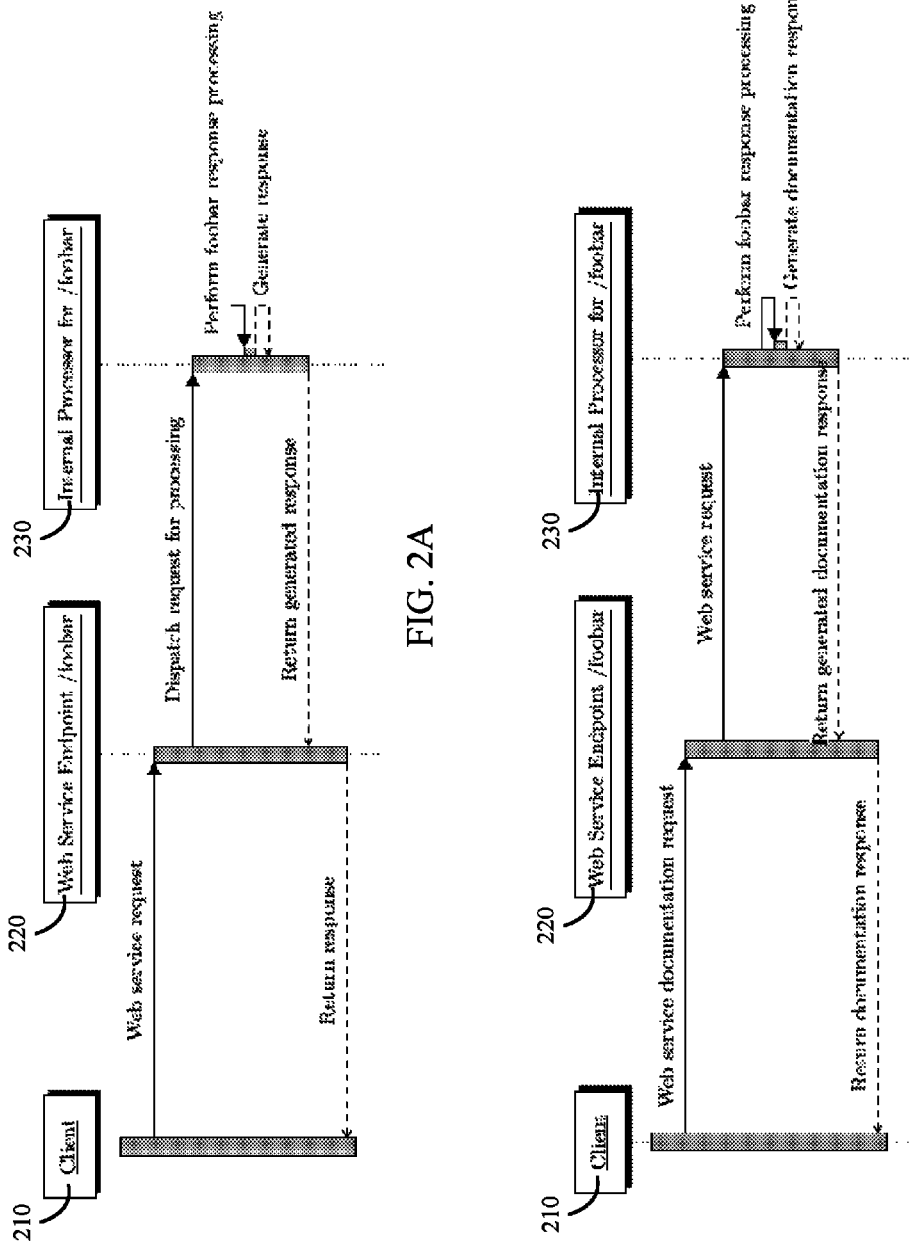
FIGS. 2A and 2B are sequence diagrams corresponding to at least one embodiment of the method of FIG. 1.

FIGS. 2A and 2B are sequence diagrams corresponding to at least one embodiment of the method of FIG. 1. FIG. 2A depicts a service response sequence while FIG. 2B depicts a documentation response sequence. The depicted sequences show the processing relationship between a requesting process 210, a dispatch process 220 (e.g., the endpoint processing method 100 shown in FIG. 1), and an dispatched process 230. The requesting process may be executed by a client while the dispatch process 220 and the dispatched process 230 may be executed on an application service endpoint.

FIG. 3A is a text diagram depicting two examples of a documentation request 310 in accordance with at least one embodiment of the present invention. The two examples conform to the hypertext transport protocol (HTTP) header standards and include an HTML documentation request 310A and a WADL documentation request 310B. In the depicted examples, each request 310 uses the HTTP GET command and specifies a function for which an example is sought via the function indicator 312. Furthermore, a documentation request indicator 314 and a format indicator 316 within the HTTP Accept field indicate that documentation in the specified format is requested. In some embodiments, documentation on every function is provided if the function indicator 312 is omitted.

FIG. 3B is a text diagram depicting two examples of a documentation response 320 in accordance with at least one embodiment of the present invention. The two examples include an HTML documentation response 320A and a WADL documentation response 320B. In the depicted examples, each document response 320 includes a header section 330 and a body section 340. The body section 340 includes the actual documentation in the appropriate format.

FIG. 4A is a text diagram depicting two embodiments of an example request 410 in accordance with at least one embodiment of the present invention. The two embodiments conform to the hypertext transport protocol (HTTP) header standards and include a JSON example request 410A and an XML example request 410B. In the depicted embodiments, each request 410 uses the HTTP GET command and specifies a function for which an example is sought via the function indicator 412. Furthermore, an example request indicator 414 and a format indicator 416 within the HTTP Accept field indicate that an example in the specified format is requested.

FIG. 4B is a text diagram depicting two embodiments of an example response 420 in accordance with at least one embodiment of the present invention. Examples may be considered a form of documentation that a user can edit (e.g., a template). The depicted embodiments include a JSON example response 420A and an XML example response 420B. In the depicted embodiments, each example response 420 includes a header section 430 and a body section 440. The body section 440 includes the actual example or template in the appropriate format.

The embodiments disclosed herein enable providing services and documentation at the same (live) endpoint which can ensure that the documentation is in sync with the provided services. For example, an application developer need not verify that the revision number detailed in the documentation matches the version of the provided services.

Figure 5A:
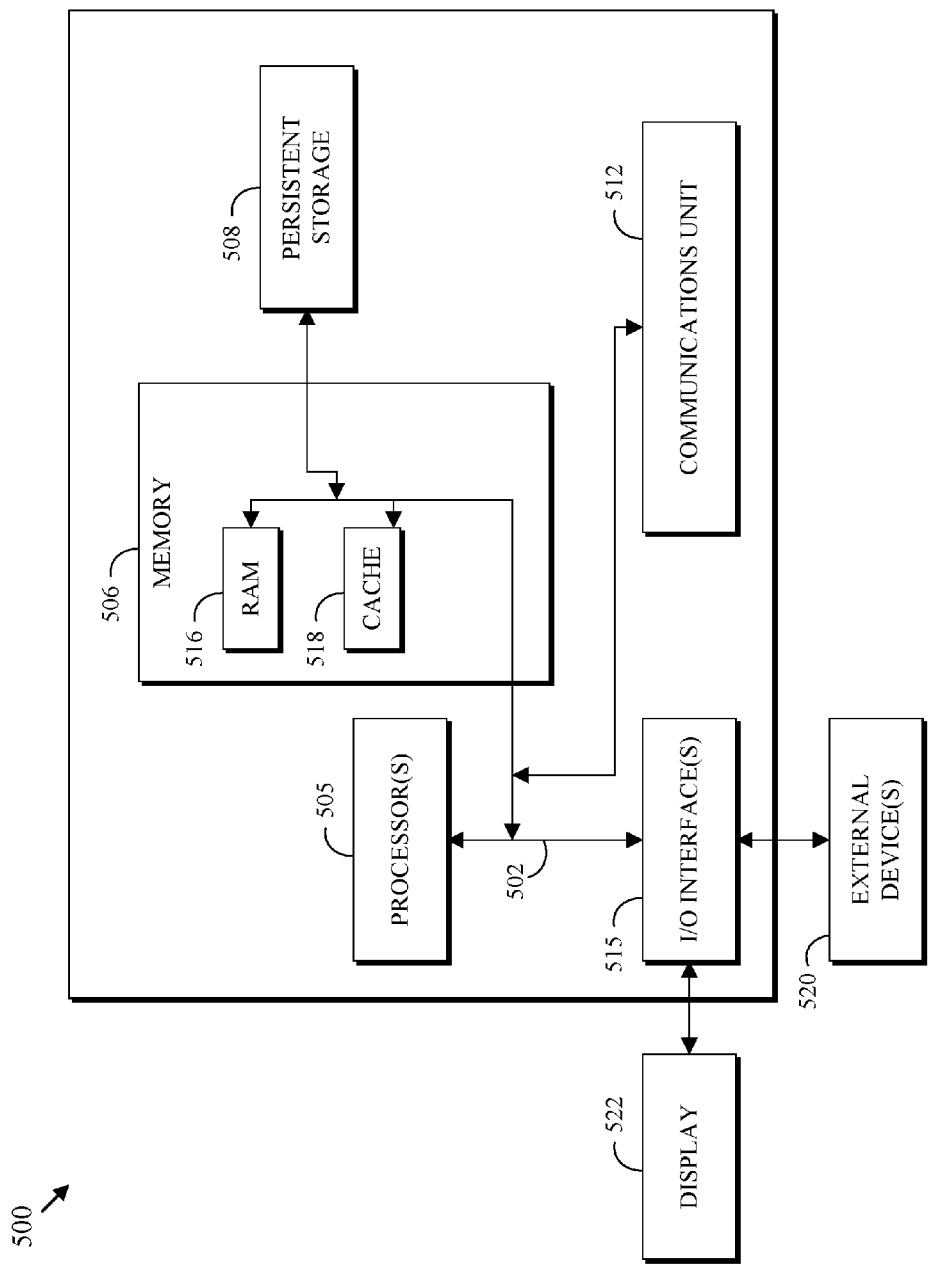
FIG. 5A is a block diagram depicting one example of a computing apparatus (i.e., computer) suitable for executing the methods disclosed herein.

FIG. 5A is a block diagram depicting one example of a computing apparatus (i.e., computer 500) suitable for executing the methods disclosed herein. For example, the computer 500 may be configured as an application service endpoint that executes the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5B:
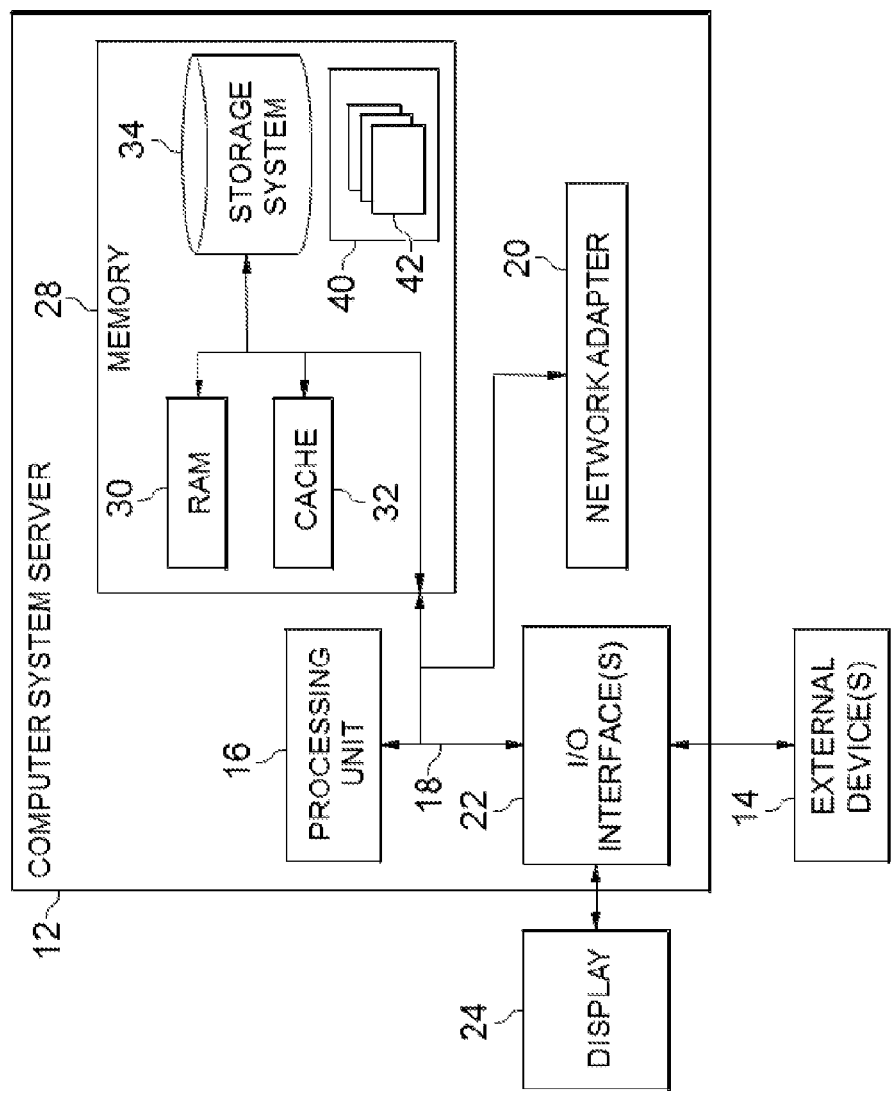
FIG. 5B depicts a cloud computing node according to an embodiment of the present invention.

Referring now to FIG. 5B, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
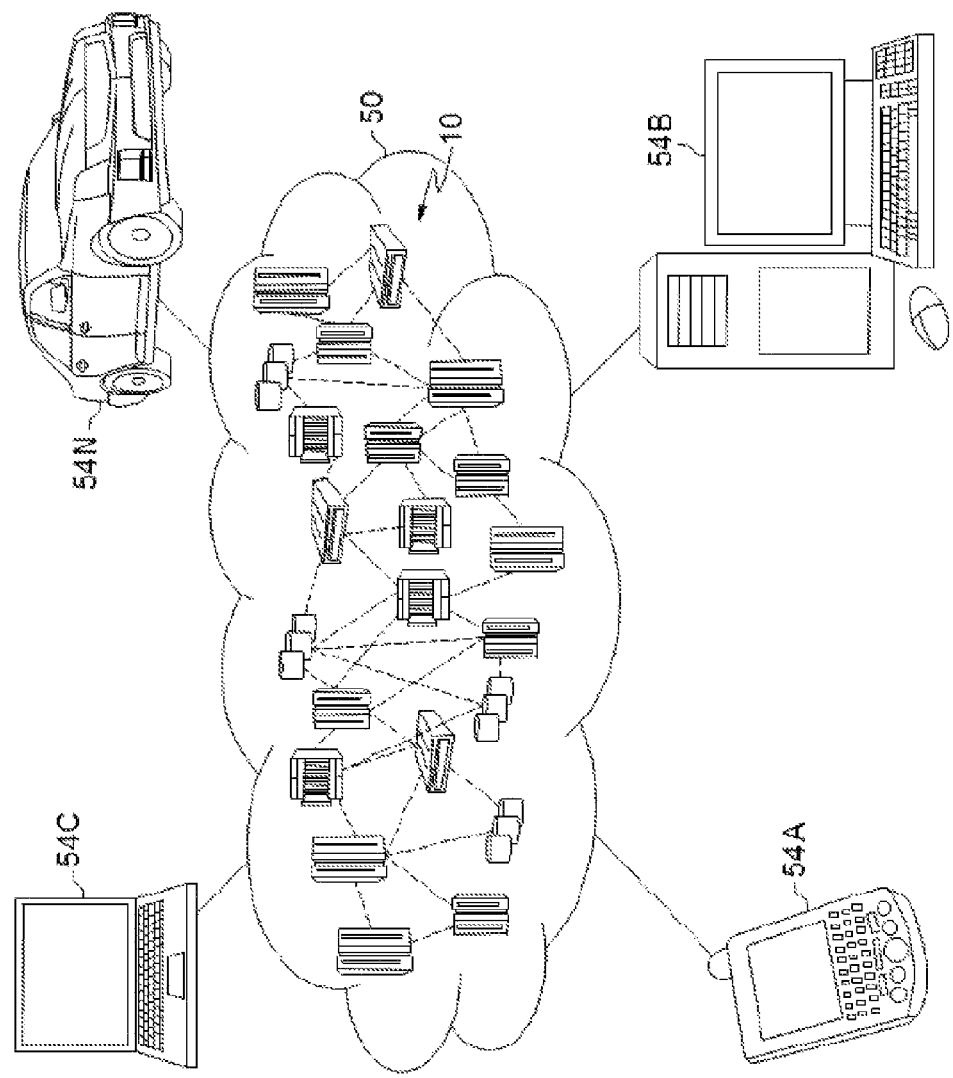
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
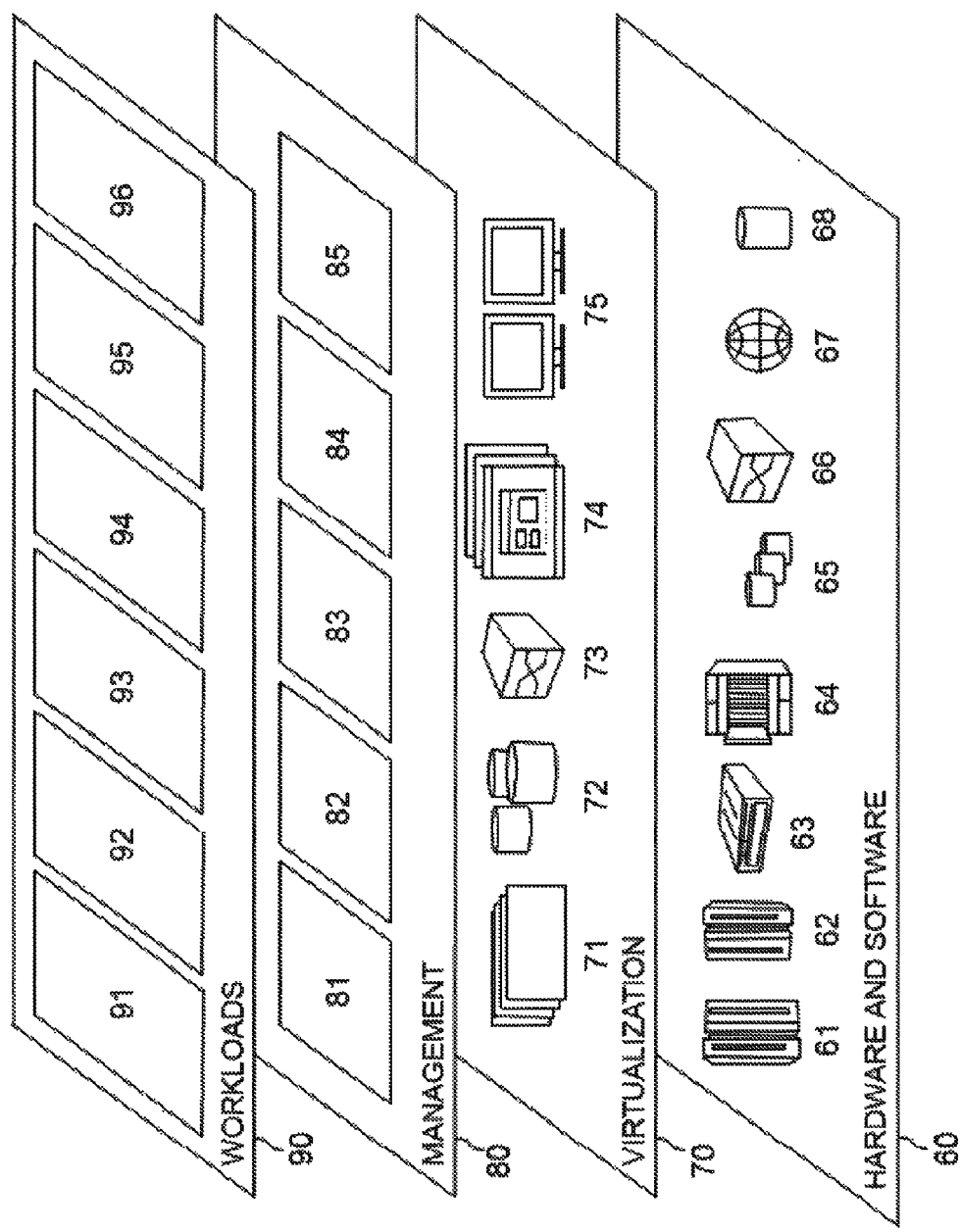
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for distributing documentation for an application service, the method comprising:
   receiving, at an endpoint configured to provide an application service, a documentation request from a requester, wherein the endpoint is a web services endpoint or a cloud services endpoint, and wherein the application service is maintained in a cloud network independently of a device local to a user of the requester, and wherein the cloud network comprises a private, community, public, or hybrid cloud network, and wherein the application service is stateless, and wherein the documentation request indicates a requested format, wherein the requested format is selected from the group consisting of XML, JSON, HTML, and WADL, and wherein the requested format indicates a template or example;
   responsive to the documentation request, preparing a response that includes documentation, wherein the documentation specifies an input data schema and an output data schema for communicating with a service function of the application service, and wherein the documentation comprises an example or template;
   transmitting the response to the requester; and
   receiving, at the endpoint, a service request for the application service and responding to the service request.

* * * * *